US009467690B2

(12) United States Patent
He et al.

(10) Patent No.: US 9,467,690 B2
(45) Date of Patent: Oct. 11, 2016

(54) COMPLEXITY-ADAPTIVE SCALABLE DECODING AND STREAMING FOR MULTI-LAYERED VIDEO SYSTEMS

(75) Inventors: Yuwen He, Burbank, CA (US); Alexandros Tourapis, Milpitas, CA (US); Peshala V. Pahalawatta, Glendale, CA (US); Athanasios Leontaris, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1083 days.

(21) Appl. No.: 13/520,874

(22) PCT Filed: Jan. 3, 2011

(86) PCT No.: PCT/US2011/020027
§ 371 (c)(1),
(2), (4) Date: Jul. 6, 2012

(87) PCT Pub. No.: WO2011/084913
PCT Pub. Date: Jul. 14, 2011

(65) Prior Publication Data
US 2013/0101015 A1    Apr. 25, 2013

Related U.S. Application Data

(60) Provisional application No. 61/292,741, filed on Jan. 6, 2010.

(51) Int. Cl.
*H04N 7/26*    (2006.01)
*H04N 19/102*  (2014.01)
(Continued)

(52) U.S. Cl.
CPC ...... *H04N 19/00012* (2013.01); *H04N 19/102* (2014.11); *H04N 19/117* (2014.11);
(Continued)

(58) Field of Classification Search
CPC ............... H04N 19/00012; H04N 19/234327;
H04N 19/2662; H04N 19/4621; H04N 19/102; H04N 19/117; H04N 19/154; H04N 19/156; H04N 19/174; H04N 19/176; H04N 19/177; H04N 19/37; H04N 19/42; H04N 19/44; H04N 19/80; H04N 19/82; H04N 19/85; H04N 19/0066; H04N 19/002; H04N 19/206; H04N 19/00272; H04N 19/278; H04N 19/00284; H04N 19/00454; H04N 19/00478; H04N 19/00538; H04N 19/80089; H04N 19/00896; H04N 19/00903
USPC ................................................. 375/240.02
See application file for complete search history.

(56) References Cited

U.S. PATENT DOCUMENTS 7,136,532 B2 * 11/2006 Van Der Schaar ............. H04N 21/23432
375/240.01
2005/0185712 A1    8/2005 Lee
(Continued)

FOREIGN PATENT DOCUMENTS

| CN | 1355995 | 6/2002 |
|---|---|---|
| CN | 101601300 | 12/2009 |

(Continued)

OTHER PUBLICATIONS

International Search Report mailed on Jul. 26, 2012 for PCT Application No. PCT/US2011/020027 filed on Jan. 3, 2011 in the name of Dolby Laboratories Licensing Corporation.
(Continued)

*Primary Examiner* — William C Vaughn, Jr.
*Assistant Examiner* — Naod Belai

(57) ABSTRACT

Adaptive decoding and streaming multi-layer video systems and methods are described. The decoding systems comprise a base layer decoder and one or more enhancement layer decoders. The streaming systems comprise a base layer packetizer and one or more enhancement layer packetizers. A decoding adaptor controls operation of the base layer and/or enhancement layer decoders. A packetizing adaptor controls operation of the base layer and/or enhancement layer packetizers.

26 Claims, 14 Drawing Sheets

(51) Int. Cl.
| | |
|---|---|
| H04N 21/2343 | (2011.01) |
| H04N 21/2662 | (2011.01) |
| H04N 21/462 | (2011.01) |
| H04N 19/176 | (2014.01) |
| H04N 19/37 | (2014.01) |
| H04N 19/117 | (2014.01) |
| H04N 19/154 | (2014.01) |
| H04N 19/156 | (2014.01) |
| H04N 19/177 | (2014.01) |
| H04N 19/174 | (2014.01) |
| H04N 19/44 | (2014.01) |
| H04N 19/80 | (2014.01) |
| H04N 19/82 | (2014.01) |
| H04N 19/42 | (2014.01) |
| H04N 19/85 | (2014.01) |

(52) U.S. Cl.
CPC .......... *H04N19/154* (2014.11); *H04N 19/156* (2014.11); *H04N 19/174* (2014.11); *H04N 19/176* (2014.11); *H04N 19/177* (2014.11); *H04N 19/37* (2014.11); *H04N 19/42* (2014.11); *H04N 19/44* (2014.11); *H04N 19/80* (2014.11); *H04N 19/82* (2014.11); *H04N 19/85* (2014.11); *H04N 21/234327* (2013.01); *H04N 21/2662* (2013.01); *H04N 21/4621* (2013.01)

(56) References Cited

U.S. PATENT DOCUMENTS

| | | | |
|---|---|---|---|
| 2006/0023748 | A1 | 2/2006 | Chandhok |
| 2007/0127576 | A1 | 6/2007 | Henocq |
| 2008/0137752 | A1 | 6/2008 | He |
| 2009/0030485 | A1 | 1/2009 | Mishra |
| 2009/0074070 | A1* | 3/2009 | Yin .......... H04N 7/50 375/240.16 |
| 2009/0097573 | A1 | 4/2009 | Choi |
| 2009/0268806 | A1* | 10/2009 | Kim .......... H04N 21/23432 375/240.01 |
| 2009/0304074 | A1 | 12/2009 | Kimoto |
| 2012/0026288 | A1 | 2/2012 | Tourapis |
| 2012/0033040 | A1 | 2/2012 | Pahalawatta et al. |
| 2012/0092452 | A1 | 4/2012 | Tourapis |

FOREIGN PATENT DOCUMENTS

| | | |
|---|---|---|
| EP | 1781035 | 5/2007 |
| EP | 1873755 | 1/2008 |
| JP | 11-225339 | 8/1999 |
| JP | 2004-507985 | 3/2004 |
| JP | 2009-533000 | 9/2009 |
| WO | 2007047736 | 4/2007 |
| WO | 2008010932 | 1/2008 |
| WO | 2009111519 | 9/2009 |

OTHER PUBLICATIONS

Written Opinion mailed on Jul. 26, 2012 for PCT Application No. PCT/US2011/020027 filed on Jan. 3, 2011 in the name of Dolby Laboratories Licensing Corporation.

International Preliminary Report on Patentability (Ch. II) and annexes mailed on Mar. 21, 2013 for PCT Application No. PCT/US2011/020027 filed on Jan. 3, 2011 in the name of Dolby Laboratories Licensing Corporation.

Zhourong Miao, et al "Optimal Scheduling for Streaming of Scalable Media" Conference Record of the Thirty Fourth Asilomar Conference on Signals, Systems and Computers, Piscataway, NJ, vol. 2, Oct. 29, 2000, pp. 1357-1362.

Kui Gao, et al "Real-Time Scheduling on Scalable Media Stream Delivery" Proceedings of the 2003 International Symposium on Circuits and Systems, vol. 2, May 25, 2003, pp. 11-824.

Isovic, D et al. "Quality Aware MPEG-2 Stream Adaptation in Resource Constrained Systems", Proc of the Euromicro Conf. on Real-Time Systems, US, IEEE Computer Society, 2004, pp. 23-32.

Daami, M. "Client Based Sycnhronization Control of Coded Data Stream", IEEE Int. Conf. on Multimedia Computing and Systems, 1997, US, IEEE Computer Society, Jun. 3, 1997, pp. 387-394.

D. C. Hutchingson, "Introducing DLP 3-D TV", http://www.dlp.com/downloads/Introducing DLP 3D HDTV Whitepaper.pdf.

ISO/IEC JTC1/SC29/WG11, "Text of ISO/IEC 14496 Multiview Video Coding" Doc. N9978, Hannover, Germany, Jul. 2008.

Hemy, M., et al., "MPEG System Streams in Best-Effort Networks", Packet Video 1999.

Meier, T. et al., "Improved Single VO Rate Control for Constant Bit-Rate Applications Using MPEG-4" Visual Communications and Image Processing 2000, Proceedings of SPIE vol. 4067, 2000.

Timmerer, Christian, "Generic Adaptation of Scalable Multimedia Resources" VDM Verlag Saarbrucken, Germany, 2008.

Yin, P., et al., "Technical Description of the Thomson Proposal for SVC CE4" MPEG meeting, Hong Kong, Jan. 13, 2005, p. 1-9.

Yin, P., et al. "Complexity Scalable Video Codec" MPEG Meeting, Oct. 13, 2004.

Ebrahimi, Touradj, "MPEG-4 Video Verification Model Version 4.1" MPEG Meeting, Nov. 11, 1996, Section 3.8, "Generalized Scalable Encoding" from p. 59 to p. 61.

Berthelot, B. et al. "Carriage of MPEG-4 SVC Over MPEG-2 Systems" MPEG Meeting, Marrakech, Jan. 10, 2007, p. 4-p. 6.

\* cited by examiner

```
SetDecodingMode( )          ──1205
{
    If ( DecTime_Avg > Dur_target * T_0 )
    {
        If ( DecTime_Avg > Dur_target * T_2 )
            DecMode = FDM_5;  ◄──────────── 1215
        Else
        {
            DecMode = DecMode+1;  ◄──────── 1210
            Clip DecMode within [ FDM-0, FDM_4 ];
        }
    }
    Else If ( DecTime_Avg < Dur_target * T_1 )
    {
        DecMode = DecMode-1;
        Clip DecMode within [ FDM_0, DecMode ];
    }
    Else
        Keep the DecMode;  ◄──────────────── 1220
}
```

FIG. 12

COMPLEXITY-ADAPTIVE SCALABLE DECODING AND STREAMING FOR MULTI-LAYERED VIDEO SYSTEMS

CROSS-REFERENCE TO RELATED APPLICATIONS

This application claims priority to U.S. Patent Provisional Application No. 61/292,741, filed Jan. 6, 2010, hereby incorporated by reference in its entirety.

FIELD

The present disclosure relates to multi-layered video systems. More in particular, it relates to complexity-adaptive scalable decoding and streaming for multi-layered video systems.

BACKGROUND

In recent years, several applications and systems have emerged that consider multi-layer approaches for the delivery of video media. Such applications or systems may include SNR or resolution, or temporally scalable systems, but also multi-view or 3D/stereo video, bitdepth and high dynamic range (HDR) applications among others. Such applications or systems may demand significant compute resources for decoding, or may be affected by bandwidth variations in a network during delivery.

The delivery of stereoscopic video has been a long-held goal of content providers. Recent innovations in display technology, such as 3D capable DLPs [see reference 1, incorporated herein by reference in its entirety] and plasma displays such as those by Mitsubishi and Samsung, have increased the urgency of developing efficient techniques for delivering stereoscopic video.

BRIEF DESCRIPTION OF THE DRAWINGS

FIG. 12 shows a high level language procedure illustrating the mode of operation of the teachings of the present disclosure.

DESCRIPTION OF EXAMPLE EMBODIMENTS

According to a first embodiment, an adaptive decoding multi-layer video system is provided, comprising: a base layer decoder; one or more enhancement layer decoders; and a decoding adaptor connected with the base layer decoder and the one or more enhancement layer decoders, the decoding adaptor controlling operation of the base layer decoder and the one or more enhancement layer decoders.

According to a second embodiment, a method for adaptive decoding of a multi-layer video system is provided, comprising: reading video information; selecting a decoding mode among a plurality of decoding modes for the video information based on decoding time of previously decoded video information; decoding the video information of one or more layers of the multi-layer system in accordance with the selected decoding mode; updating the decoding time of the previously decoded video information after each decoding; and repeating said reading, selecting, and decoding if further video information is available.

According to a third embodiment, an adaptive multi-layer video server adapted to send video packets to clients over a network is provided, comprising: a base layer video packetizer; one or more enhancement layer video packetizers; and a packetizing adaptor connected with the base layer video packetizer and the one or more enhancement layer video packetizers, the packetizing adaptor controlling operation of the base layer video packetizer and the one or more enhancement layer video packetizers.

Further embodiments of the disclosure are provided in the specification, drawings and claims of the present application.

Figure 1A:
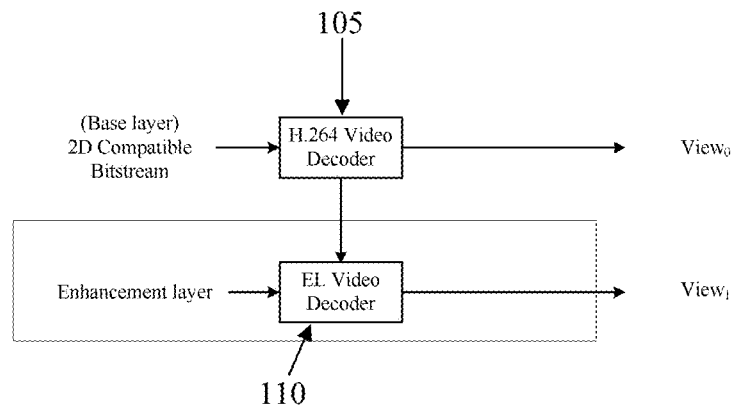
FIGS. 1A and 1B show a system overview of a 3D video decoding framework.
Figure 1B:
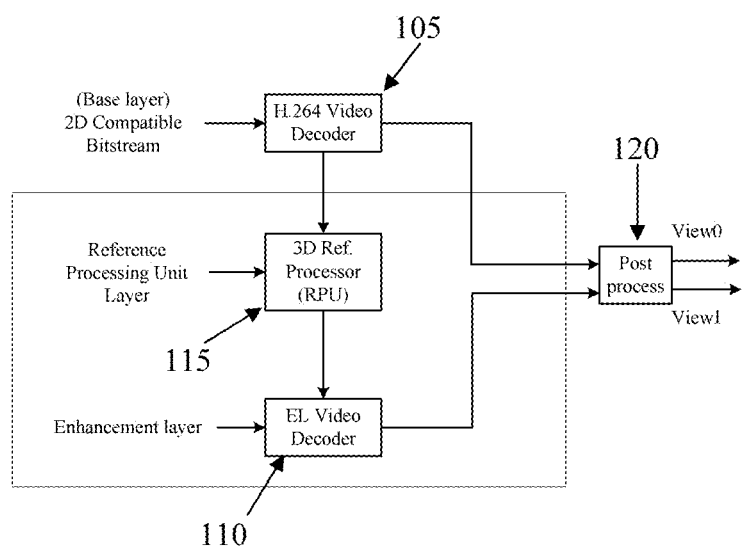

FIGS. 1A and 1B illustrate an overview of decoding systems where a base (105) and an enhancement layer (110) decoder are shown. An exemplary architecture employing the decoding system of FIG. 1A is the Stereo High Profile (SHP) of the MPEG-4 AVC/H.264 standard. This profile is a special case of the Multiview Video Coding (MVC) extension of MPEG-4 AVC that adds stereo video coding support in the standard specification. See, for example, reference 2, incorporated herein by reference in its entirety. An exemplary architecture employing the decoding system of FIG. 1B is Dolby's Frame Compatible Full Resolution (FCFR) system. See, for example, U.S. Provisional Patent Application 61/170,995 filed on Apr. 20, 2009 for "Directed Interpolation and Data Postprocessing" and U.S. Provisional Patent Application 61/223,027 filed on Jul. 4, 2009 for "Encoding and Decoding Architectures for Format Compatible 3D Video Delivery", both of which are incorporated herein by reference in their entirety. In MPEG-4 AVC SHP, each view is stored in a separate layer. The base layer of Dolby FCFR stores half the number of samples from each view and may be constructed by different interleaving methods, such as checkerboard and side-by-side interleaving among others. The enhancement layer provides the remaining information of the two views (the other half samples for each view). The decoding system will combine the pictures output from both layers to generate two views in full resolution.

In the system of FIG. 1B, a reference processing unit (RPU) is shown (115). The RPU processes the output picture from the base layer to generate a high quality reference that may be later used for motion-compensated prediction of the enhancement layer. A post processing unit (120), also shown in FIG. 1B, may also be included. In a 3D application example, the post processing unit can produce the full resolution pictures of each view by combining the output of the two decoders (105, 110).

Embodiments of the present disclosure are directed to complexity-adaptive decoding and streaming techniques as later discussed with reference to FIG. 13. As already mentioned above, such techniques can be used, for example, for real-time playback and streaming of 3D video coding systems on a variety of platforms ranging from high-end to low-end processing systems. The teachings of the present disclosure can also be applied to other, similar scalable solutions such as 3D solutions presented by companies such as Sensio and Real-D, or other solutions that employ similar scalable concepts. The person skilled in the art will also understand that the teachings of the present disclosure are not to be restricted to 3D applications only but could involve quality scalability systems, bit depth scalability, including high dynamic range scalable solutions among others.

Further applications of the present disclosure are directed to seamless video streaming across heterogeneous and varying networks such as those described in references 3-5, incorporated herein by reference in their entirety.

Figure 2A:
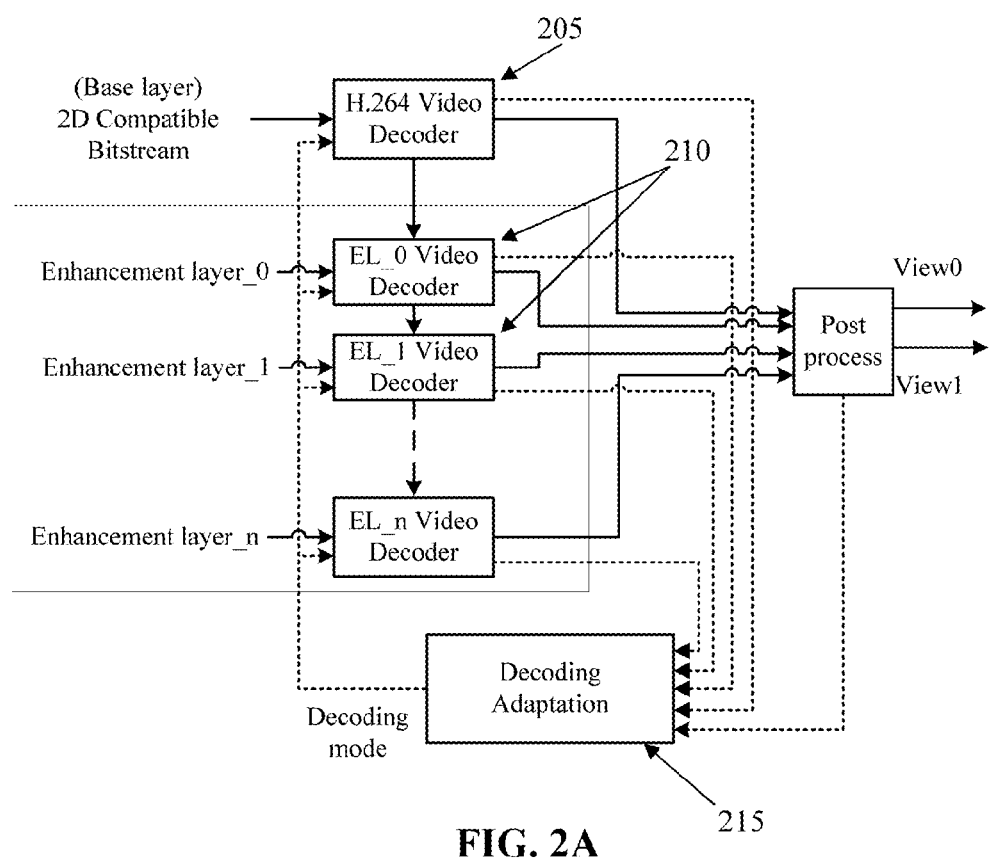
FIGS. 2A and 2B show block diagrams of a scalable decoding architecture in accordance with the teachings of the present disclosure.
Figure 2B:
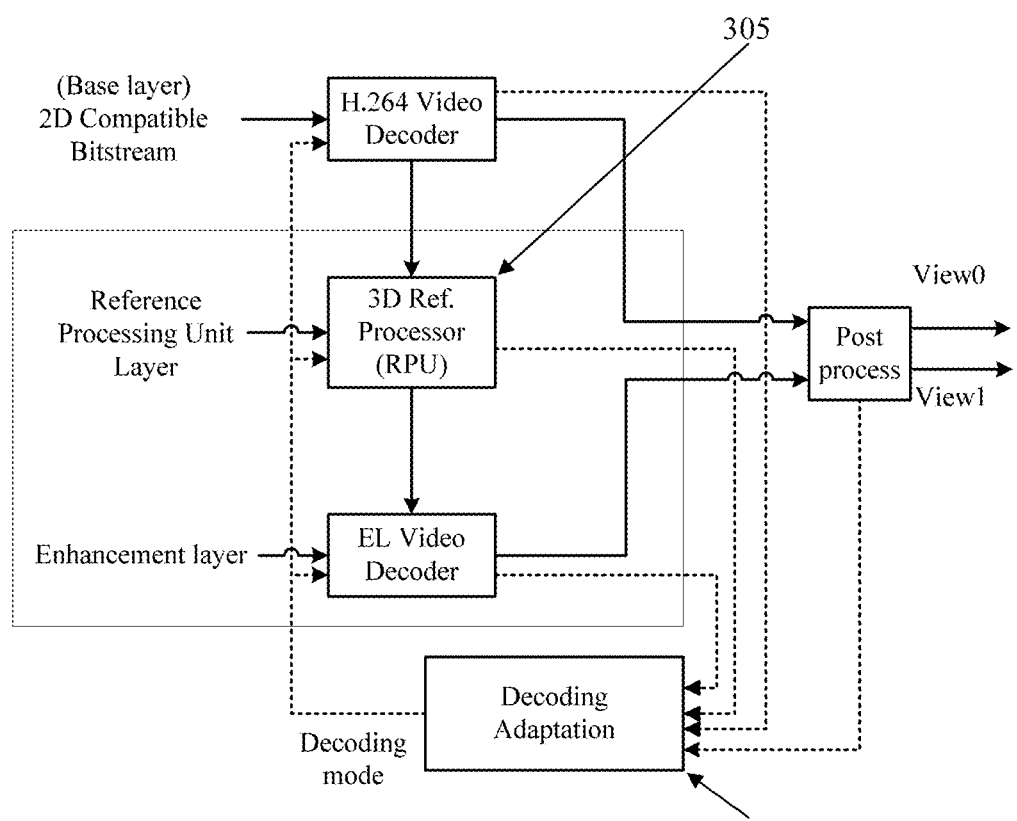

According to several embodiments of the present disclosure, a complexity metric and an adaptation mechanism are provided. FIGS. 2A and 2B show a decoding adaptation module which controls operation of the base layer decoder, RPU and enhancement layer decoder. In the embodiment of FIG. 2A, a base layer decoder (205) and one or more enhancement layer decoders (210) are shown. In the embodiment of FIG. 2B presence of an RPU (305) is also taken into account.

In particular, for each of the base layer decoder and enhancement layer decoder, the decoding adaptation module (215) is able to enable a full decoding mode, a simplified decoding mode, or even enable skipping of that decoding mode altogether. Similarly, for the RPU, the decoding adaptation module is able to enable full filtering, partial filtering or skipping of the RPU step altogether.

The decoding adaptation block of FIGS. 2A and 2B is adapted to receive feedback from all other blocks, such as base decoder, enhancement decoders, and RPU. The information passed to the decoding adaptation block can include information about the decoding complexity, dependencies between blocks or coding units (through bitstream analysis or metadata that may even exist in the bitstream), as well as information about power usage and video quality. Quality considerations may include distortion introduced up to now and possible distortion if certain decisions are taken later on. All such information is processed in the module to perform the decoding adaptation in order to decide which module should be affected and how much. Similar considerations can be made with reference to the streaming embodiment (including network characteristics), as later discussed with reference to FIG. 13.

In the examples shown in the following paragraphs, six different decoding modes with different complexity are considered. However, the person skilled in the art will understand that any number of different decoding modes can be considered. While the examples of the following figures show one enhancement layer and an RPU, the person skilled in the art will understand that the RPU is optional and more than one enhancement layer can be provided, if desired.

Figure 3:
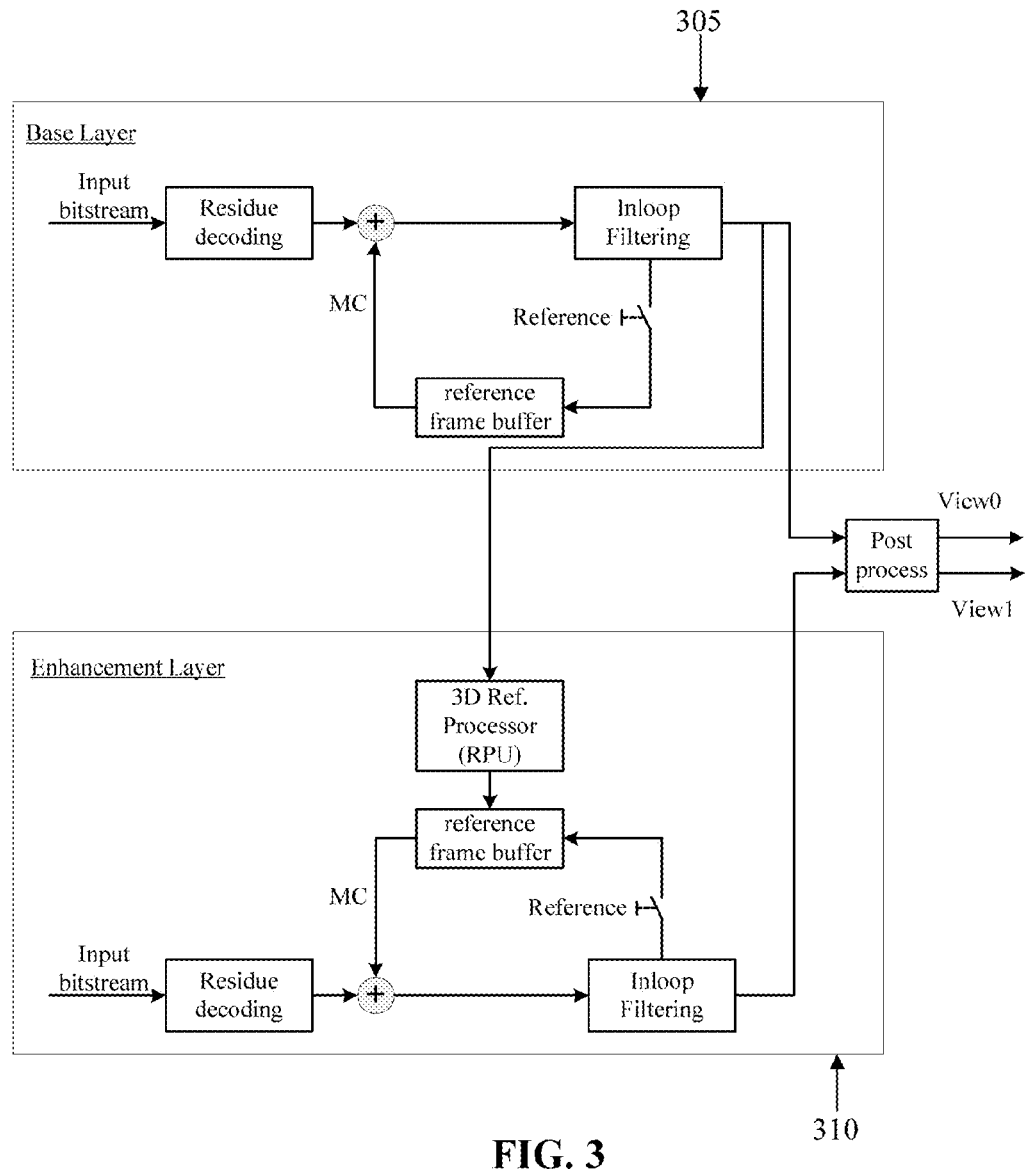
FIG. 3 shows a full decoding mode (FDM-0) in accordance with an embodiment of the disclosure.

FIG. 3 shows a first example of decoding mode, where the most computationally complex mode (also called full decoding mode) is applied both to the base layer (305) and the enhancement layer (310). Such mode will be referred to as FDM-0 throughout the present disclosure. The picture quality will degrade when using the fast decoding modes, with, however a controlled quality loss.

Figure 4:
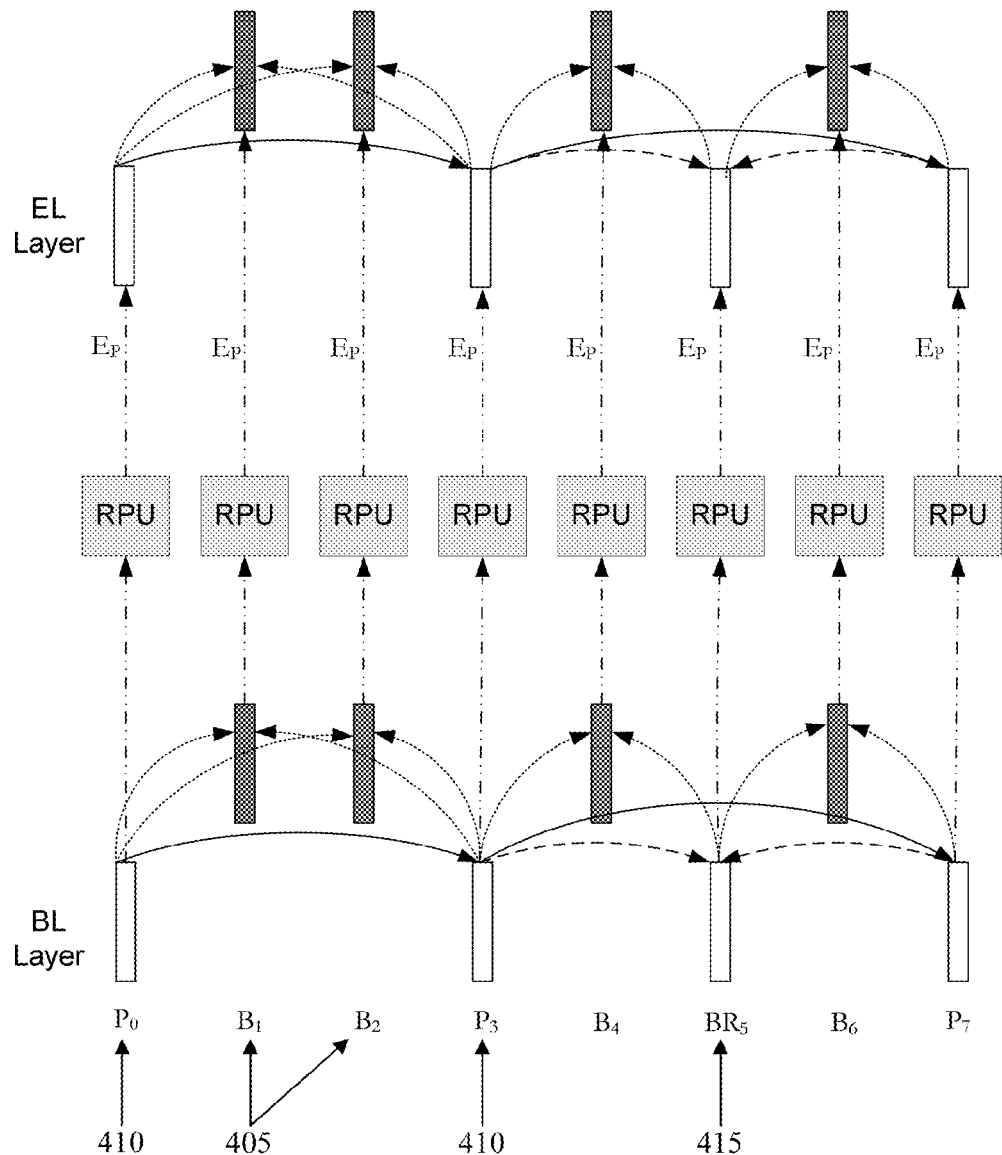
FIG. 4 shows the picture's decoding dependency.

FIG. 4 shows the picture dependency in the decoding process. As an example, disposable bi-predictive pictures (B) (405) depend on predictive pictures (P) (410) but are not used as references and therefore, any errors that occur in decoding such pictures will not affect the decoding process of other pictures. P pictures may be used as reference pictures for succeeding P pictures and B pictures. The error in a P picture will propagate to following P and B pictures dependent on it, and, even worse, this kind of error will propagate within a whole Group of Pictures (GOP). Note here that B coded pictures can be disposable but may also be used as references (415) for motion-compensated prediction (denoted as RB pictures in this illustration). The same is also true for intra-coded (I) or uni-predictive-coded pictures (P). While in past coding standards I and P were always used as references and B pictures were deemed disposable, in MPEG-4 AVC/H.264 this is no longer the case. Any type of picture may be signaled as disposable.

The images between two intra (I) coded pictures, that can usually be independently decoded, are commonly considered as belonging into a single GOP. In MPEG-4 AVC, intra coded pictures may have to be Instantaneous Decoder Refresh (IDR) pictures, or be signaled as Random Access Units. As a result, for the illustrated example coding structure, a P picture is more important than a B coded picture. Similar dependencies may exist when using hierarchical coding structures with fixed or adaptive GOPs.

Therefore, in accordance with some embodiments of the present disclosure, an attempt will be initially made to reduce the decoding complexity of disposable pictures. If the decoding speed is still slower than the target decoding speed and the decoding complexity of the current reference picture is higher than a given threshold, then the decoding complexity of the reference picture will be reduced, depending also on its impact to future pictures in the GOP. The decoding mode can also be determined based on a higher level, such as GOP level instead of only picture level. In other words, instead of making decisions one picture at a time, the system can make decisions at the GOP level or for every N pictures at a time. That is, the decoder (or server in the streaming case later explained in FIG. 13), can evaluate its complexity capabilities (or network bandwidth in the streaming embodiment) and immediately make decisions that affect all these pictures in the current GOP. That is, it may say that deblocking could be skipped for all enhancement layer pictures, or that there will be no decoding of enhancement layers for all pictures in the GOP (or not transmit any enhancement layer info for the streaming case of FIG. 13), or even analyze the dependencies in the GOP and based on that determine which pictures should be decoded fully, or partially (and at what level) or not at all. In such case, the decisions are done at a global level. However, this does not exclude additional refinements that could be done also at a local level (picture or slice). Therefore, the process can be local, global or a combination of local and global.

Figure 5:
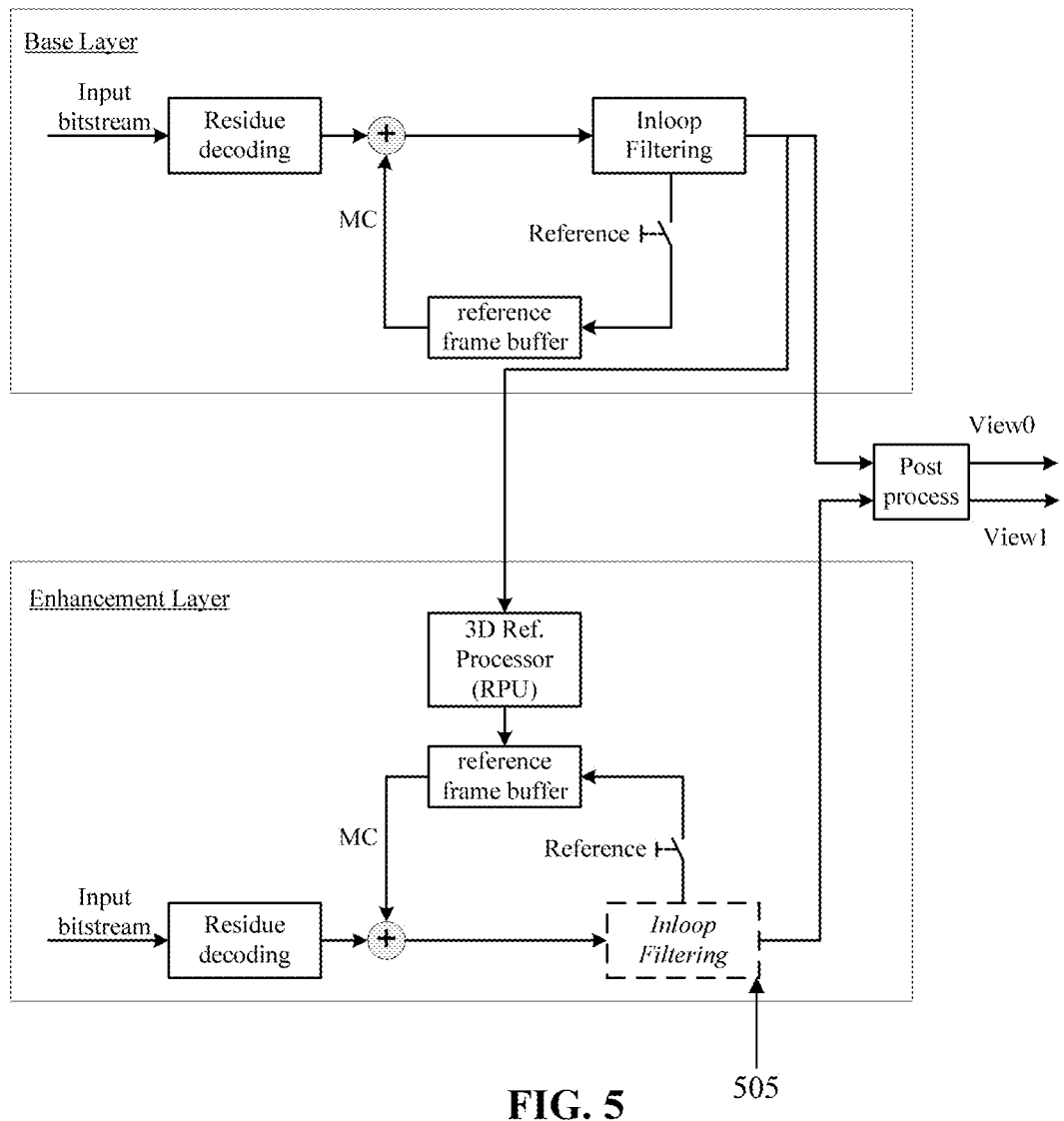
FIG. 5 shows a further decoding mode (FDM-1) in accordance with the disclosure.

FIG. 5 illustrates a second decoding mode, less complex than the FDM-0 mode, referred to herein as FDM-1 mode. According to such mode, decoding at the enhancement layer is simplified. By way of example, the deblocking process of non-reference pictures (usually B pictures) can be simplified or even eliminated (505). For example, the deblocking process can be simplified by using simpler deblocking filtering mechanisms than the ones specified by the system, simplifying or disabling the deblocking process of only certain color components, or even simplifying or disabling the deblocking process for only certain slices.

Decision on when and how to modify the deblocking process can depend not only on complexity but also on how quality is affected for the picture. The decision could be based on information about the picture or group of pictures collected during decoding. By way of example, the decision could be based on the motion of the picture or slice, or based on signaled information such as metadata that provide hints to such process in the bitstream.

Using the FDM-1 mode shown in FIG. 5, the decoding process is sped up compared to FDM-0 at the cost of usually a small picture quality loss. Because this mode only affects disposable non-reference pictures, the error due to this simplified decoding process will not propagate to subsequently decoded pictures.

Figure 6:
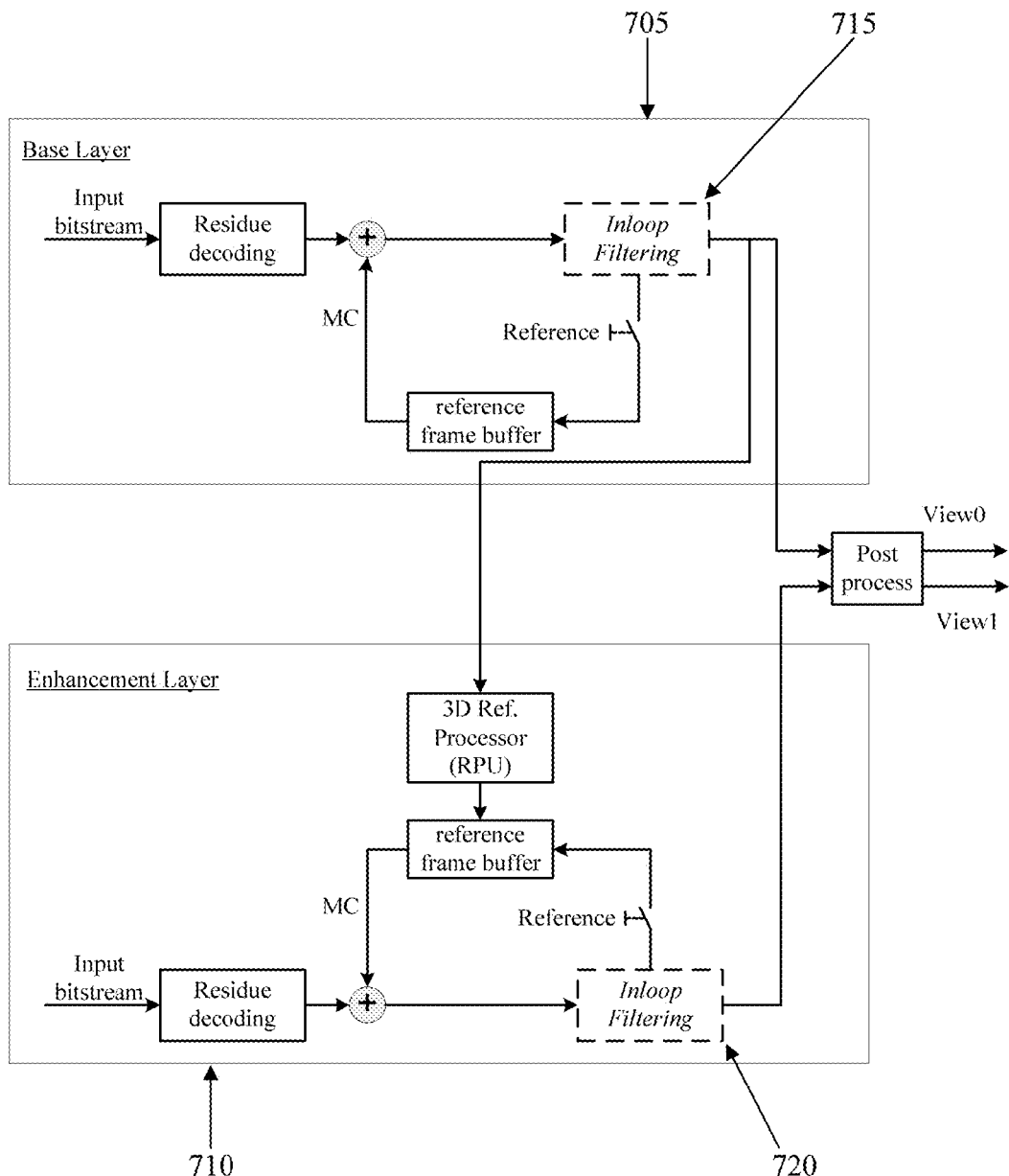
FIG. 6 shows another decoding mode (FDM-2) in accordance with the disclosure.

FIG. 6 shows a simpler decoding mode compared to FDM-1, which will be referred to as FDM-2. According to such mode, decoding at both the base layer (705) and the enhancement layer (810) is simplified (815, 720). By way of example, the deblocking process of a non-reference picture both at the base layer and the enhancement layer is simplified or even skipped. Even though this may result in some further distortion in the enhancement layer, because of the alteration of the reference provided by the RPU, as well as some distortion in the base layer, there will be no resulting drift during decoding since such frames are not used as references of any other pictures. It should be noted that the simplification method for the base and enhancement layers can be different and can be any one of the simplification methods discussed above with reference to FDM-1.

The decoding methods FDM-1 and FDM-2 shown in FIGS. 5 and 6 can be used if the decoding speed is slightly lower than the target speed.

FIGS. 7-10 will show two additional fast decoding modes (called FDM-3 and FDM-4) that can result in further simplification of the decoding process.

Figure 7:
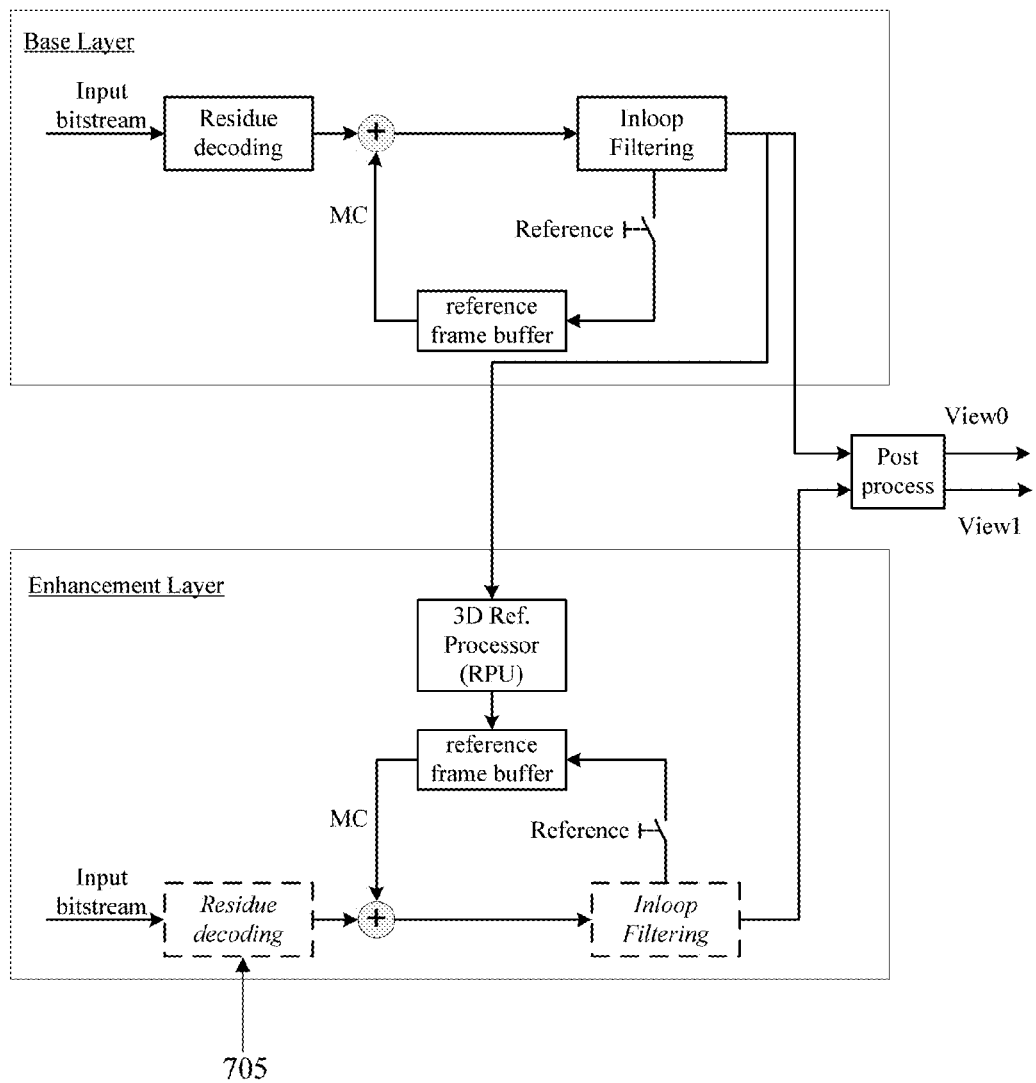
FIG. 7 shows yet another decoding mode (FDM-3) in accordance with the disclosure.

FIG. 7 illustrates the decoding mode FDM-3, where the enhancement layer is simplified through additional simplification of its residue decoding process when decoding non-reference or disposable pictures. The residue decoding process (705) includes sub-processes such as entropy decoding, inverse transform and inverse quantization. Therefore, there are different ways by which such process can be simplified, by simplifying one or more of the above sub-processes. Additionally, the residue decoding can be simplified for different slices, where each slice can use a different simplification method based on metadata or analysis.

Figure 8:
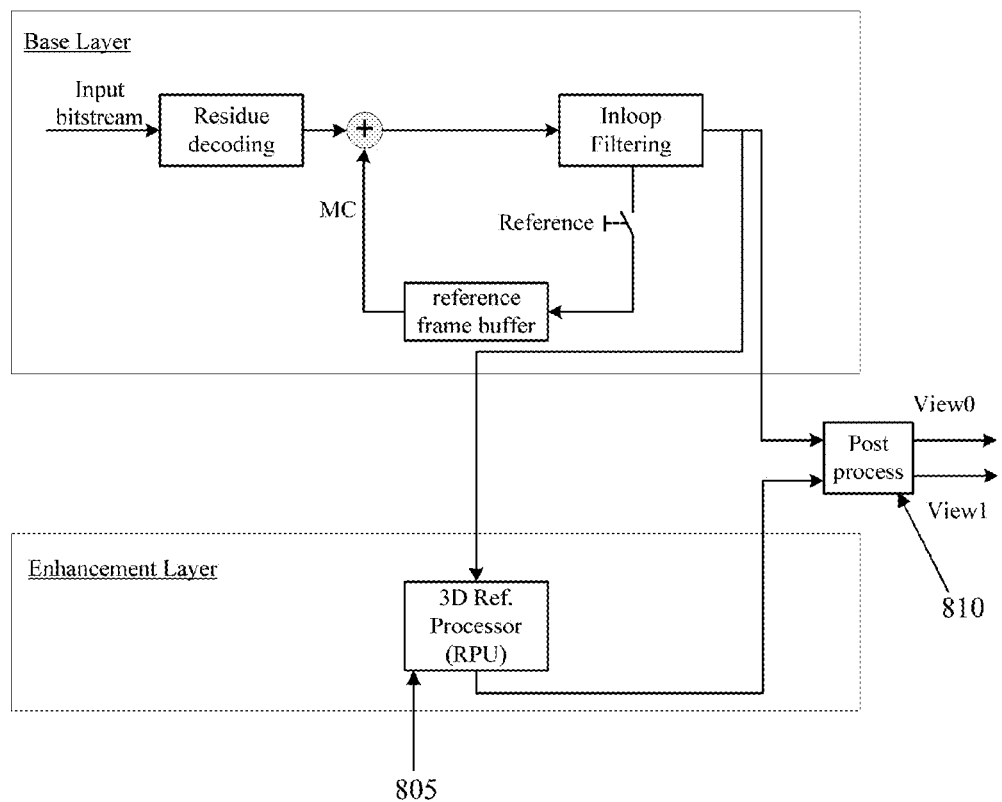
FIG. 8 shows a skip simplification of the decoding mode of FIG. 7.

In a particular embodiment, the entire residue decoding process can be skipped, as shown in FIG. 8. In this case, the output of the RPU (805) process will be taken as the output of enhancement layer. In case of 3D video coding, the decoder will produce the full resolution picture by multiplexing together the output of the base layer and the output of the RPU unit in a post-processing step (810).

The decoding mode FDM-3 will introduce some additional distortion since some high frequency signal stored in the residue part of the compressed bitstream will not match that at encoder side. However, no error propagation will occur. Moreover, the error can be well controlled in embodiments where metadata are used to help the simplification methods, or if the simplification method is content adaptive. For example, the quality distortion of the residue decoding process simplification can be measured at the encoder side based on slice level, and this information can be embedded in the bitstream as metadata. At the decoder, the decoder can make a decision to enable certain simplifications or not according to the distortion information. Instead of distortion information, the dependencies between different slices or pictures could also be provided, while the distortion information could just be an estimate of potential distortion that could be introduced to the bitstream if a simplified decoding method is considered. In the streaming embodiment later discussed in FIG. 13, error control can occur by not signaling certain information.

In a different embodiment, only certain slices in a picture can be selected for decoding, or decoding of all slices in parallel can be started and stopped after a certain time has passed or after a certain number of macroblocks in these slices have been decoded. For the remaining regions that have not been decoded, the signal from the RPU can be used instead, as shown in FIG. 8.

Figure 9:
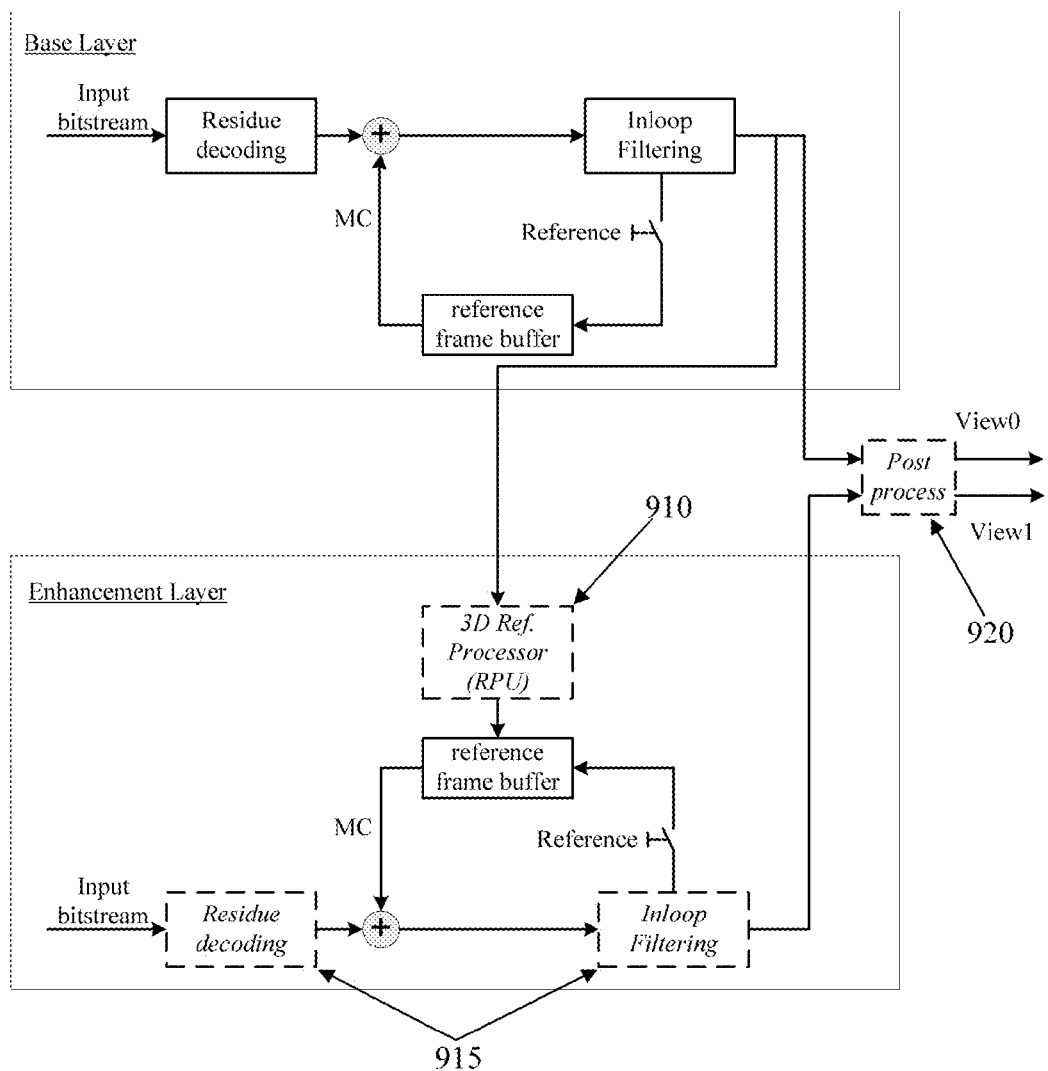
FIG. 9 shows a still further decoding mode 4 (FDM-4) in accordance with the disclosure.

FIG. 9 illustrates a further decoding mode, referred to herein as FDM-4 mode. According to such embodiment, the RPU process (910), the enhancement layer decoding (915) (such as residue decoding and deblocking) and the post-processing (920) of non-reference pictures at the enhancement layer can be simplified. In particular, the simplification process could involve using a different interpolation filter than the one specified, not decoding some macroblocks that use expensive subpixel positions and reverting to the RPU processed signal, not decoding macroblocks that use bi-prediction or weighted prediction etc. The simplification can work on each sub-process or each slice. The RPU process can also be simplified by either using different filters than the ones specified. For example, a shorter filter could be used instead of a longer filter, 1D filers could be used instead of 2D filters, fixed filters could be used instead of an explicit filter and so on. These filters can be selected for the entire picture, regions (different filters can be signaled in the RPU for different regions), or even at the color component level.

Figure 10:
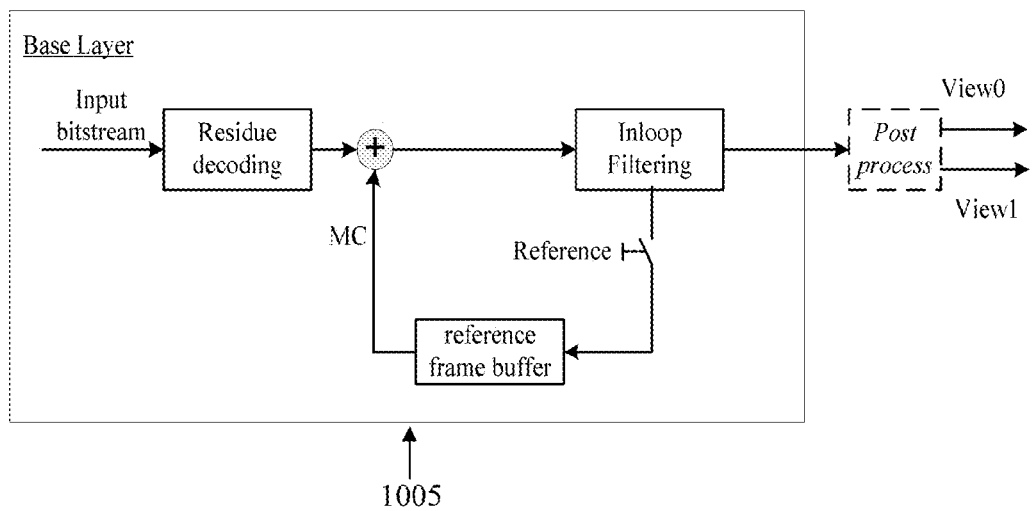
FIG. 10 shows a skip simplification of the decoding mode of FIG. 9.

FIG. 10 show a special case of the embodiment of FIG. 9, where the RPU process, residue decoding process and deblocking process are skipped (1005). The FDM-4 process could also be extended to the base layer, assuming that the enhancement layer has already been completely skipped and that the base layer belongs to a non-reference picture.

The simplification processes shown in the above figures and embodiments can also be extended to reference pictures as well, in case the use of one or more of the above embodiments does not, still, result in sufficient decoder complexity or desirable streaming functionality. A decoding mode extending the above embodiments to reference pictures will be referred to herein as FDM-5. This is the fastest decoding mode and can be used on the base layer, enhancement layer or both. In such case, bad artifacts may occur if the simplifications are not done in a controlled manner. Considerations, for example, of where a picture is in the GOP, and how far and by how much the quality will be impacted due to any decoding simplifications, as well as the implications in complexity and streaming, can significantly help in the selection of the process that should be applied to this picture, if any. A picture, for example that is near the end of the GOP, even if it is a reference picture, could be more easily sacrificed than other pictures early on in the GOP since its quality will not propagate to too many pictures. Moreover, it is desirable to act on reference pictures in the enhancement layer (through simplification or skipping) before affecting reference pictures in the base layer.

In particular, when the current picture is a reference picture, the decoding complexity of such picture will be estimated, as later explained in subsequent paragraphs, in order to reduce the quality loss as much as possible, while at the same time the increase in decoding speed is maximized Once the decoding complexity of such picture is known or estimated, if there is no side information to indicate the picture's distortion (provided through, e.g., metadata), the decoding process can be handled as follows. If the estimated complexity of the decoding process of such picture is lower than a first threshold $T_{FDM-5}^0$, meaning that the complexity is low enough for the decoding capabilities of systems, then no changes occur in the decoding process. Otherwise if the estimated complexity is higher than the first threshold but lower than a second threshold $T_{FDM-5}^1$, meaning that the complexity is neither too low nor too high, then an initial simplification of the decoding process occurs, such as simplification of the deblocking process. If, on the other hand, the complexity is higher than the second threshold $T_{FDM-5}^1$ then a further simplification occurs, such as simplification of the residue decoding process and deblocking process.

The above described embodiments have been described at the picture level. However, different embodiments can be provided, where all of the proposed decoding modes can be applied, for example, at the slice level, which is a sub-picture/region level. Application at the slice level can occur both for reference and non-reference pictures. The above mentioned thresholds used for the reference pictures can be computed based on previous observations during the decoding of the bitstream, the average time that one budgets for decoding a picture and how much time is available for the current picture to ensure that decoding will happen without exceeding this budget, and so on.

Additionally, if desirable, a system may decide to group multiple pictures together and perform such decisions for these pictures jointly, instead of considering a single picture or slice at a time. The savings in complexity by skipping or reducing decoder complexity for multiple pictures could result in savings that could be used for other pictures, which may have a much more important impact in subjective quality than the current one. The decision of whether to skip multiple pictures or not could be based on picture similarity which could be provided in bitstream metadata, or even inferred given bitstream information such as motion vectors that may be available in the bitstream. If, for example motion vectors of two subsequent pictures are similar, then it is known that these pictures would also be similar and can be simplified (e.g. skipped) together using similar methods.

Figure 11:
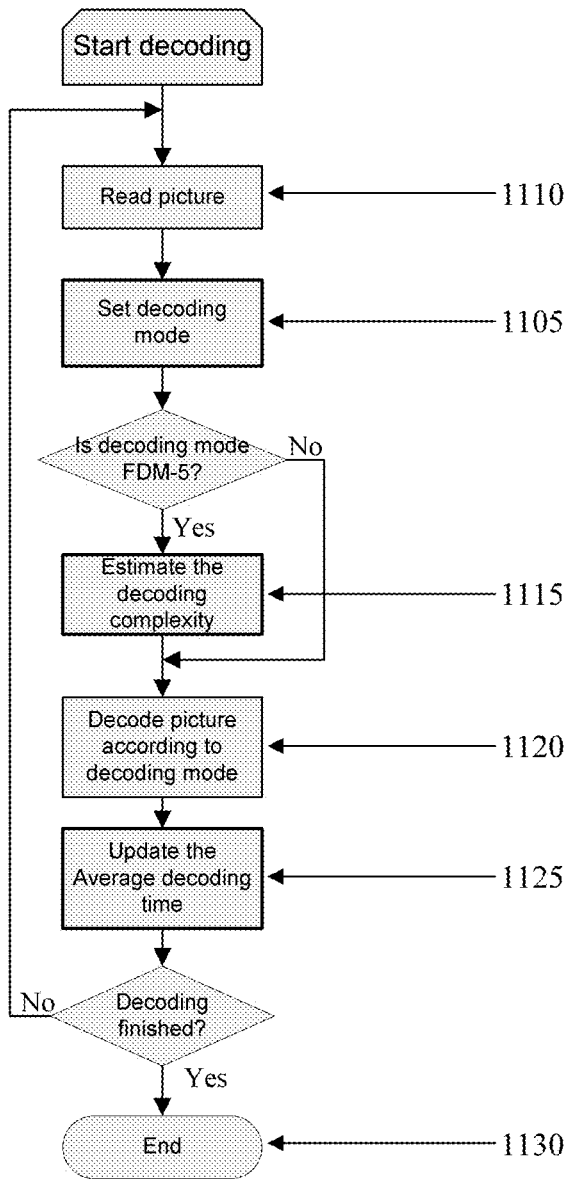
FIG. 11 shows a scalable decoding algorithm in accordance with the teachings of the present disclosure.

An embodiment of scalable decoding procedure that controllably applies the above described simplifications is shown in FIG. 11. A decoding mode is initially set (1105) after reading of a picture (1110). An example of how to set the decoding mode will be illustrated with reference to FIG. 12, later described. If the selected decoding mode is the fastest decoding mode FDM-5, which provides simplification of reference pictures as well, as described above, the decoding complexity is also estimated. As already noted above with reference to the description of the decoding mode FDM-5, estimation of the decoding complexity (1115) and later comparison with threshold parameters allows a controlled selection of which simplifications to perform inside such decoding mode. The slice, picture, or GOP is then decoded according to the selected decoding mode (1120). The average decoding time is then updated (1123) in accordance with equations that will be described later. The process is then repeated until decoding is terminated (1130).

Turning now to FIG. 12, an example of a decoding mode setting algorithm to be used in accordance with the disclosure will be described. If the average decoding time (DecTime$_{Avg}$) is greater than a first threshold $T_0$, (1205) the decoding complexity will be reduced by changing the decoding mode to a simplified version (DecMode=DecMode+1) (1210). If the average decoding time is greater than a second threshold $T_2$ ($T_2>T_0$), which means that the current decoding is quite slow, the decoding mode is set to the least complex one, such as the FDM-5 mode discussed above (DecMode=FDM_5) (1215). If the average decoding time is not greater than threshold $T_0$ and less than threshold $T_1$, which means the decoding is fast enough, the decoding complexity will be increased to ensure better picture quality. If, on the other hand, the average decoding time is not greater than threshold $T_0$ and not greater than threshold $T_1$, the previously used decoding complexity will be kept (Keep the DecMode) (1220).

In the following paragraphs, four equations will be discussed for a better understanding of the processes involved in FIGS. 11 and 12. Equation (1) will describe how the average decoding time is updated in the flow chart of FIG. 11. On the other hand, equations (2)-(4) will describe how decoding complexity is estimated.

In particular, Equation (1) describes an example of how the average decoding time DecTime$_{Avg}$ can be updated. $\alpha$ is the factor that controls the updating speed, which can depend on the length of Group of Picture (GOP). By way of example, $\alpha$ can decrease with a longer GOP.

$$\text{DecTime}_{Avg} = \text{LastPicDecTime} \cdot \alpha + \text{DecTime}_{Avg} \cdot (1-\alpha) \quad (1)$$

Turning now to the estimation of decoding complexity step of FIG. 11, such process can be comprised of two parts.

In the first part, the complexity of the RPU process is estimated. Such complexity depends on the filter type and area of partition and can be calculated, for example, by Equation (2). The complexity of RPU processing of the entire picture is the sum of the complexity of all partitions.

$$\text{Complexity}_{RPU} = \sum_i \text{Complexity}(\text{filter}_i) \cdot \text{Area}(\text{Partiton}_i) \quad (2)$$

The second part deals with the estimation of the residual decoding complexity. Such estimation depends on the number of coded bits and the slice type and can be calculated by Equation (3) through estimation, for example, with a lookup table. Such table can be built for the decoding times of different slice types with same size taking into account previous decoding statistics.

$$\text{Complexity}_{Residue} = \sum_i \text{Complexity}(\text{type}(\text{slice}_i), \text{BitLength}(\text{slice}_i)) \quad (3)$$

The overall complexity can be estimated in Equation (4) where the results of equations (2) and (3) are taken into account and where $\beta$ is a weighting factor that corresponds to the ratio of the complexity of the RPU process compared to the whole decoding process. It is measured on the basis of gathered statistics.

$$\text{Complexity}_{picture} = \text{Complexity}_{RPU} \cdot \beta + \text{Complexity}_{Residue} \cdot (1-\beta) \quad (4)$$

Metadata information, signaled for example using an SEI (Supplemental Enhancement Information) message, MPEG-4 or MPEG-2 transport or program layer user specified messages or through other mechanisms can be used to provide side information about the distortion impact of a slice, picture or GOP. Such additional information may be useful to determine possible simplifications in the control of mode FDM-5 as described above. For example, the decoder can receive a measure of the quality of each slice or picture, and/or picture dependencies, and the impact any decoder simplification may have to the quality or complexity as metadata. Given this information, the decoder can determine even for reference pictures, how the decoder simplification process will be performed by first impacting slices that will result in only small distortion, while also having significant impact on overall decoder complexity. Decision could be distortion- or complexity-based only, but could also be based on a joint decision, e.g. using a Lagrangian optimization method.

It should be noted that in the example of FIG. 12 the SetDecodingMode algorithm only specifies performance based on timing and does not account directly for quality. Further embodiments are possible, where quality can be more directly controlled. For example, if two methods result in similar decoding time savings, the one resulting in lower distortion could be selected. Alternatively, all modes that would result in a complexity reduction of at least N % could be considered, they could be jointly evaluated, and the one that results in the best performance $J=D+\lambda C$ could be selected, where D is introduced distortion, C is complexity and $\lambda$ is the Lagrangian multiplier.

Additional information, such as to where it is safe or not to perform any simplification, GOP and prediction relationships, etc can also be provided. Information on the complexity of a picture can also be provided through metadata. However, in some cases complexity may have to be calculated, or refined (over the presence of metadata) by analyzing the bitstream.

Although embodiments of the present disclosure take into account complexity estimation processes, such processes can still be lower in complexity than performing a full decoding operation.

In particular, an estimate of complexity at the slice level can be derived by first examining the number of bits such slice occupies. If that is not sufficient, partial or complete entropy decoding only can be performed. Doing so, allows determination of the header information bits vs the texture bits. If the bitstream comprises a large number of header bits, meaning the presence of a large number of motion vectors, that would suggest that too much processing may have to be performed for motion compensation and even deblocking if enabled in the bitstream. On the other hand, if the texture information is significant, then that may suggest that a large amount of time may have to be spent during decoding for the transform and quantization process.

The above described complexity analysis can affect any layer and any modes discussed in the present disclosure.

If further information is needed, just motion information of the video can be decoded, without performing the full motion compensation process, to obtain a better estimate of the decoding complexity of the picture. If this is deemed satisfactory, then the full decoding of the picture follows, otherwise all remaining decoding steps can be skipped or simplified as discussed earlier.

The teachings of the present disclosure can be used for real time decoding and streaming of 3D video coded images on different platforms, such as low end platforms. They can be used, for example, on a video decoder, playback device, and also within some display devices that are capable of displaying high resolution stereoscopic views.

The teachings of the present disclosure can also be used in video streaming servers considering network transmission bandwidth and the client's decoding capability. A generic depiction of the process occurring in a video streaming server is shown in FIG. 13.

In a streaming application, similarly to what discussed with reference to the previous figures, the server will adapt the packetizing process (1305) according to the feedback including packet loss ratio and delay from clients (1310) while trying to keep the best quality for the clients. Packetizing refers to the process of splitting the data to be delivered into small units and encapsulating each unit into a formatted block whose format is friendly for network transmission, such as an IP packet. Traffic information is provided by the client back to the adaptation module on the server side. When the packet loss ratio is quite low, the server will send all packets of all layers. If, on the other hand, the packet loss ratio is increasing but still low, then the server will first discard the enhancement layer packets on disposable slices. The server will then discard the base layer packets on disposable slices if packet loss ratio is still increasing, and discard enhancement layer packets on non-disposable slices further. Therefore, in the application of FIG. 13, instead of adjusting the bitstream for decoder complexity, only some packets are signaled to the client (thus reducing the overall bit rate and load of the network) while considering the same dependencies in the bitstream. The streaming or packetizing adapter of FIG. 13 can receive information from the server itself (either independently from the clients or after processing client information) and/or from the client or clients.

According to an embodiment of the disclosure, the server can also select to discard information that could result in some small drift or "errors" during decoding. This could be signaled to the client as metadata. Furthermore, given this knowledge, on the client side the client can try (if possible and/or desired) to correct these errors. The server may know the abilities of the client (or even clients in a multi-cast environment) and allow such scenarios to happen based on the knowledge of these abilities. By way of example, a Lagrangian cost can be provided where the parameters may include network bandwidth, quality of each client, power consumption (if relevant), and so on.

Figure 13:
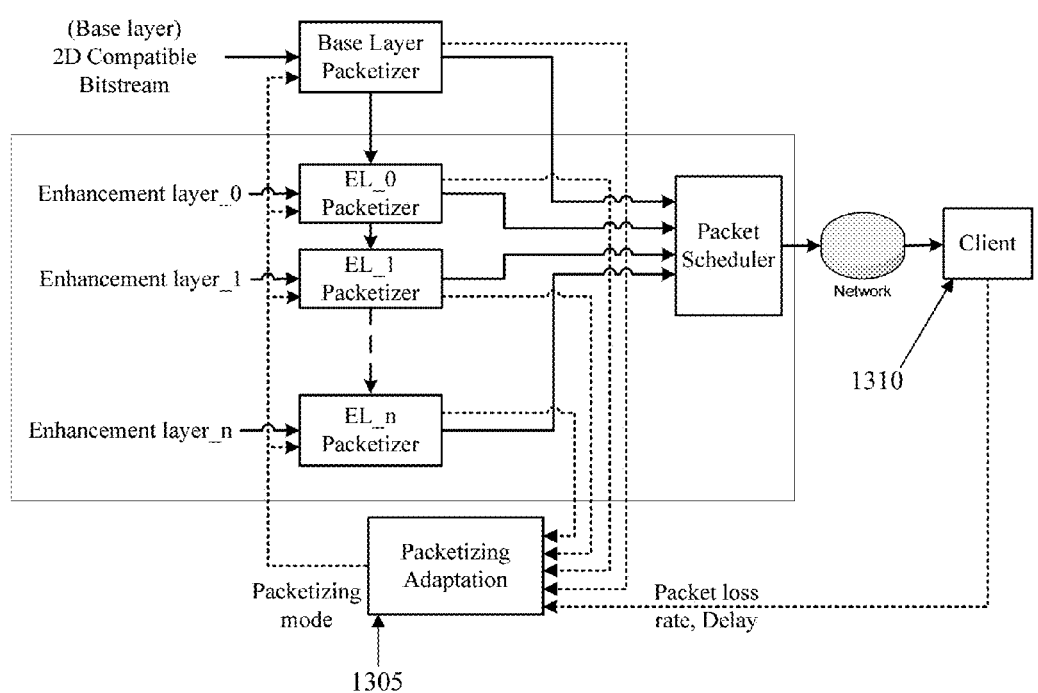
FIG. 13 shows a block diagram of a scalable packetizing architecture in accordance with a further embodiment of the disclosure.

Embodiments of the present disclosure are also provided, where the architecture of FIG. 2 on the decoding side is combined with the architecture of FIG. 13 on the server side.

Some embodiments of the present disclosure focus on techniques of adapting bitstreams to achieve seamless video delivery and best user experience across different platforms and systems primarily in the context of stereoscopic video solutions. However, the person skilled in the art will understand that the concepts presented here could apply to other similar systems as well, such as High Dynamic Range (HDR)-like scalable systems, or multi-view coding.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

D. C. Hutchison, "Introducing DLP 3-D TV", http://www.dlp.com/downloads/Introducing DLP 3D HDTV Whitepaper.pdf ISO/IEC JTC1/SC29/WG11, "Text of ISO/IEC 14496-10: 200X/FDAM 1 Multiview Video Coding", Doc. N9978, Hannover, Germany, July 2008

M. Hemy, U. Hengartner, P. Steenkiste, T. Gross, "MPEG System Streams in Best-Effort Networks", PacketVideo 1999.

T. Meier, K. N. Ngan, "Improved single VO rate control for constant bit-rate applications using MPEG-4", *Visual Communications and Image Processing* 2000, *Proceedings of SPIE Vol.* 4067, 2000.

Christian Timmerer, "Generic Adaptation of Scalable Multimedia Resources", *VDM Verlag Saarbrucken, Germany*, 2008.

The invention claimed is:

1. An adaptive decoding multi-layer video system comprising:
   a base layer decoder;
   one or more enhancement layer decoders;
   a reference processing unit connected with the base layer decoder and the one or more enhancement layer decoders, the reference processing unit being configured to store reference frames; and
   a decoding adaptor connected with the base layer decoder, the reference processing unit and the one or more enhancement layer decoders, the decoding adaptor receiving feedback from the base layer decoder, the reference processing unit and the one or more enhancement layer decoders, the decoding adaptor controlling operation of the base layer decoder, the reference processing unit and the one or more enhancement layer decoders, the decoding adaptor being configured to:
      read a frame under consideration;
      set a decoding mode for the frame under consideration based on a decoding time of previously decoded frame;
      calculate a decoding time for the frame under consideration;
      determine whether the decoding time is higher or lower than a first threshold;
      if the decoding time is higher than the first threshold: decrease a complexity of the set decoding mode;
      determine whether the decoding time is higher or lower than a second threshold, the second threshold being lower than the first threshold; and
         if the decoding time is higher than the second threshold, further decrease the complexity of the set decoding mode; and
      decode the frame under consideration according to the set decoding mode;
      update the decoding time of the previously decoded frame after each decoding, wherein the decoding time comprises an average decoding time or a nonaverage decoding time; and
      repeatedly read, set, and decode if further frame is available.

2. The system as recited in claim 1, further comprising: one or more processing modules providing the one or more enhancement layer decoders with filtered predictions from the base layer decoder, wherein the decoding adaptor further controls operation of the one or more processing modules.

3. The system as recited in claim 1, wherein the decoding adaptor controls operation of the base layer decoder and the one or more enhancement layer decoders based on information gathered from one or more of the base layer decoder and the one or more enhancement layer decoders.

4. The system as recited in claim 1, further comprising a post processing module, wherein the decoding adaptor controls operation of the base layer decoder and the one or more enhancement layer decoders based on information gathered from the post processing module.

5. The system as recited in claim 4, wherein the post processing information comprises coding time information related to the base layer decoder and the one or more enhancement layer decoders.

6. The system as recited in claim 1, wherein the decoding adaptor controls operation of the base layer decoder and/or one or more enhancement layer decoders by simplifying operation of the base layer decoder and/or one or more enhancement layer decoders.

7. The system as recited in claim 6, wherein the base layer and one or more enhancement layer decoders each comprise a residue decoding module and an in-loop filtering module, and wherein simplification of the base layer decoder or one or more enhancement layer decoders occurs by simplifying or eliminating one or more of the residue decoding module and an in-loop filtering module of the base layer decoder and/or one or more enhancement layer decoders.

8. The system as recited in claim 1, wherein the operation of the base layer decoder and the one or more enhancement layer decoders is controlled with reference to one or more of images, portions of images, slices, sequences of images or groups of pictures (GOP).

9. The system as recited in claim 8, wherein the decoding adaptor controls operation of one or more of non-reference images or reference images.

10. The system as recited in claim 1, wherein the decoding adaptor controls the operation of the base layer decoder and the one or more enhancement layer decoders on the basis of one or more of:
   one or more complexity estimates;
   average decoding time;
   decoded quality estimation; or
   metadata based information.

11. The system as recited in claim 1, wherein the decoding adaptor is further configured to: determine whether the frame under consideration is a reference picture upon which other pictures depend, and increase or decrease the complexity of the decoding mode based on whether the frame under consideration is a reference picture.

12. A method for adaptive decoding of a multi-layer video system, comprising:
reading video information;
selecting a decoding mode from among a plurality of decoding modes for the video information based on a decoding time of previously decoded video information;
calculating a decoding time for the video information for the selected decoding mode;
determining whether the decoding time is higher or lower than a first threshold;
if the decoding time is higher than the first threshold:
decreasing a complexity of the selected decoding mode:
determining whether the decoding time is higher or lower than a second threshold, the second threshold being lower than the first threshold; and
if the decoding time is higher than the second threshold, further decreasing the complexity of the selected decoding mode;
decoding the video information of one or more layers of the multi-layer system in accordance with the selected decoding mode;
updating the decoding time of the previously decoded video information after each decoding, wherein the decoding time comprises an average decoding time or a nonaverage decoding time; and
repeating the reading, selecting, and decoding if further video information is available.

13. The method as recited in claim 12, wherein plurality of decoding modes comprises a fastest decoding mode, the method further comprising, when the fastest decoding mode is selected:
estimating decoding complexity of the fastest decoding mode.

14. The method as recited in claim 12, wherein a decision on which layer of the multi-layer system to decode in the fastest decoding mode is based on the estimated decoding complexity of the fastest decoding mode.

15. The method as recited in claim 12, wherein a decision as to whether to use simplified decoding for one or more layers of the multi-layer system is based on one or more of:
the estimated decoding complexity of the fastest decoding mode; or
one or more image quality considerations.

16. The method as recited in claim 12, wherein the video information comprises reference picture information and non-reference picture information, the method further comprising, when a decoding mode of video information comprising reference picture information is selected:
estimating decoding complexity of the decoding mode.

17. The method as recited in claim 16, wherein a decision that relates at least one of: which layer of the multi-layer system to decode in the decoding mode; or whether to use simplified decoding for one or more layers of the multi-layer system, is based on the estimated decoding complexity of the decoding mode.

18. The method as recited in claim 17, wherein the simplified decoding decision is further based on one or more image quality considerations.

19. The method as recited in claim 12, wherein the video information comprises one or more of:
one or more pictures;
one or more portions of pictures; or
one or more series of pictures.

20. The method as recited in claim 19, wherein: the picture portions comprise slices; or the series of pictures comprises a group of pictures (GOP).

21. The method as recited in claim 12, wherein the multi-layer system comprises a base layer and one or more enhancement layers.

22. The method as recited in claim 21, wherein the multi-layer system comprises one or more reference processors, which are adapted to communicate decoding information from the base layer to the one or more of the enhancement layers.

23. The method as recited in claim 12, wherein:
the plurality of decoding modes differ from each other based on the amount of simplification of decoding operations to be performed on one or more layers of the multi-layer system, and
the decoding mode selection is based, at least in part, on a comparison of an average decoding time of one or more previously effected decoding operations with a target threshold.

24. The method as recited in claim 23, wherein the decoding mode selection comprises selecting between: keeping a previously selected decoding mode, selecting a faster decoding mode, and selecting a slower decoding mode.

25. The method as recited in claim 23, wherein the decoding mode selection is further based, at least in part, on one or more image quality considerations.

26. A non-transitory computer-readable storage media that comprises a set of instructions stored therewith which, when executed by one or more computing or processing devices, causes performance of a process, the process comprising the steps of:
reading video information;
selecting a decoding mode from among a plurality of decoding modes for the video information based on a decoding time of previously decoded video information;
calculating a decoding time for the video information for the selected decoding mode;
determining whether the decoding time is higher or lower than a first threshold;
if the decoding time is higher than the first threshold:
decreasing a complexity of the selected decoding mode;
determining whether the decoding time is higher or lower than a second threshold, the second threshold being lower than the first threshold; and
if the decoding time is higher than the second threshold, further decreasing the complexity of the selected decoding mode;
decoding the video information of one or more layers of the multi-layer system in accordance with the selected decoding mode;
updating the decoding time of the previously decoded video information after each decoding;
wherein the decoding time comprises an average decoding time or a non-average decoding time; and
repeating the reading, selecting, and decoding if further video information is available.

* * * * *